United States Patent [19]
Rosen

[11] Patent Number: 5,148,621
[45] Date of Patent: Sep. 22, 1992

[54] DEER REPELLING APPARATUS

[76] Inventor: Howard L. Rosen, Rte. 3, Box 115, Dillwyn, Va. 23936

[21] Appl. No.: 835,522

[22] Filed: Feb. 14, 1992

[51] Int. Cl.$^5$ ............................................. A01M 31/00
[52] U.S. Cl. .......................................... 43/1; 446/216
[58] Field of Search ................. 43/1, 2; 446/216, 215, 446/236, 204; 116/137 R, 24, 22 A, 23

[56] References Cited

U.S. PATENT DOCUMENTS

| | | | |
|---|---|---|---|
| 3,292,319 | 12/1966 | McCarthy | 116/22 A |
| 3,461,603 | 8/1969 | Rowell | 446/215 |
| 3,799,105 | 3/1974 | Porter | 116/22 A |
| 4,656,770 | 4/1987 | Nuttle | 43/1 |

*Primary Examiner*—Richard K. Seidel
*Assistant Examiner*—Chuck Y. Mah
*Attorney, Agent, or Firm*—Leon Gilden

[57] ABSTRACT

An apparatus is arranged with a rigid support post mounting a drive motor at an upper distal end thereof, with the drive motor including an output shaft orthogonally oriented relative to the front wall of the post rotatably mounting an arm thereon. The arm includes respective first and second whistling members mounted tangentially relative to a circle of rotation defined by rotation of the arm to effect a repelling of deer and the like thereabout. A modification of the invention includes a disc member mounted concentrically relative to the output shaft of the drive motor, with the disc including weighted members radially directed relative to the output shaft to effect vibration directed through the support posts to discourage and repel subterranean pests.

5 Claims, 4 Drawing Sheets

DEER REPELLING APPARATUS

BACKGROUND OF THE INVENTION

1. Field of the Invention

The field of invention relates to deer repelling apparatus, and more particularly pertains to a new and improved deer repelling apparatus to discourage deer from entering a field such as used in agricultural communities.

2. Description of the Prior Art

Deer and other such animals are a nuisance to farmers and individuals engaged in agricultural crop production. Such animals are subject to create damage to crops and thereby effect economic loss to an agricultural community. While the prior art has addressed various repelling structure such as set forth in the U.S. Pat. 3,813,143 to Hubbs, the structure is arranged for repelling deer relative to an automotive vehicle.

U.S. Patent 4,965,070 to Messina sets forth a chemical deer repellent formulation relative to plant structure.

As such, it may be appreciated there continues to be a need for a new and improved deer repelling apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of animal repelling apparatus now present in the prior art, the present invention provides a deer repelling apparatus wherein the same effects auditory generation of noises to effect repelling of deer relative to an agricultural environment. As such, the general purpose of the present invention, which will be described subsequently in greater detail, is to provide a new and improved deer repelling apparatus which has all the advantages of the prior art deer repelling apparatus and none of the disadvantages.

To attain this, the present invention provides an apparatus arranged with a rigid support post mounting a drive motor at an upper distal end thereof, with the drive motor including an output shaft orthogonally oriented relative to the front wall of the post rotatably mounting an arm thereon. The arm includes respective first and second whistling members mounted tangentially relative to a circle of rotation defined by rotation of the arm to effect a repelling of deer and the like thereabout. A modification of the invention includes a disc member mounted concentrically relative to the output shaft of the drive motor, with the disc including weighted members radially directed relative to the output shaft to effect vibration directed through the support posts to discourage and repel suberranean pests.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists. Engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved deer repelling apparatus which has all the advantages of the prior art deer repelling apparatus and none of the disadvantages.

It is another object of the present invention to provide a new and improved deer repelling apparatus which may be easily and efficiently manufactured and marketed.

It is another object of the present invention to provide a new and improved deer repelling apparatus which is of a durable and reliable construction.

An even further object of the present invention is to provide a new and improved deer repelling apparatus which is susceptible of a low cost of manufacture with regard to both materials and labor, and which accordingly is then susceptible of low prices of sale to the consuming public, thereby making such deer repelling apparatus economically available to the buying public.

Still yet another object of the present invention is to provide a new and improved deer repelling apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
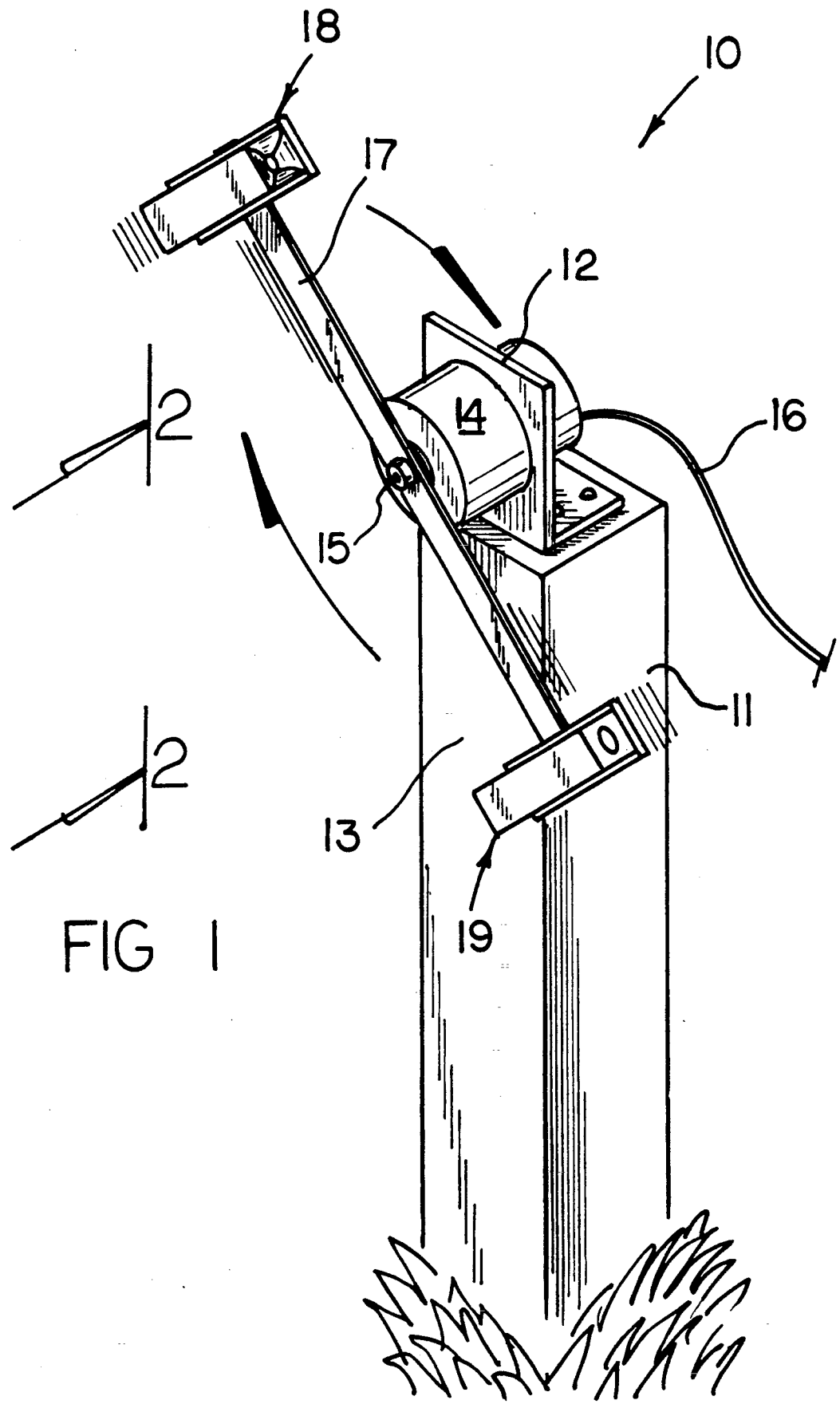
FIG. 1 is an isometric illustration of the instant invention.
Figure 2:
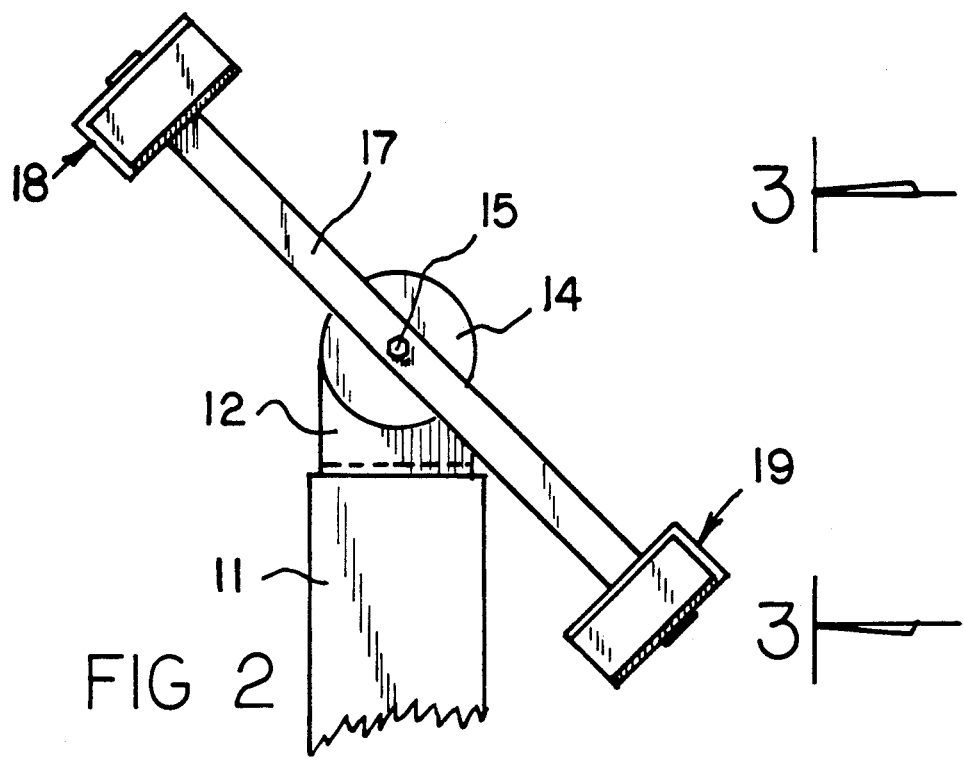
FIG. 2 is an orthographic view, taken along the lines 2—2 of FIG. 1 in the direction indicated by the arrows.
Figure 3:
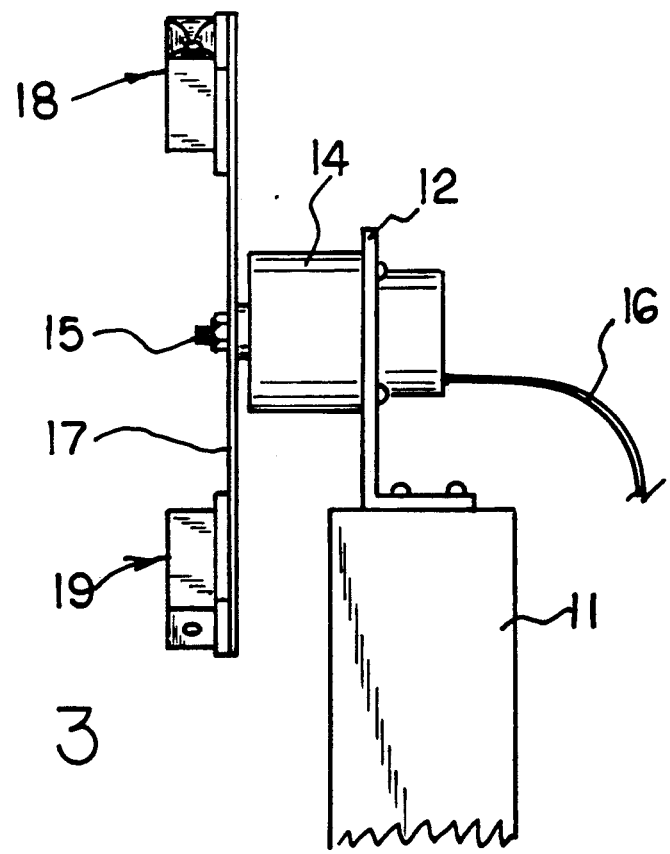
FIG. 3 is an orthographic view, taken along the lines 3—3 of FIG. 2 in the direction indicated by the arrows.

With reference now to the drawings, and in particular to FIGS. 1 to 7 thereof, a new and improved deer repelling apparatus embodying the principles and concepts of the present invention and generally designated by the reference numeral 10 will be described.

More specifically, the deer repelling apparatus 10 of the instant invention essentially comprises a rigid vertical support post 11, with a mounting plate 12 secured fixedly to an upper distal end of the support post 11. The mounting plate 12 includes a drive motor 14 fixedly mounted thereto, with the drive motor including an output shaft 15 rotatably mounted relative to the drive motor, with the output shaft oriented orthogonally relative to and beyond a support post front wall 13. An electrical power supply 16 provides for electrical energy directed to the drive motor 14 in a conventional manner.

A mounting arm 17 is medially and orthogonally intersected by the output shaft 15 and includes a first whistle member 18 and a second whistle member 19 orthogonally mounted to opposed distal ends of the mounting arm 17, wherein the first and second whistle members 18 and 19 are tangentially aligned relative to a circle orientation defined by the first and second whistle members 18 and 19 that are oriented an equal distance relative to the output shaft 15. In this manner, rotation of the mounting arm 17 effects audible presentation by the whistle members for a deer repelling audible signal to be directed therefrom.

Figure 4:
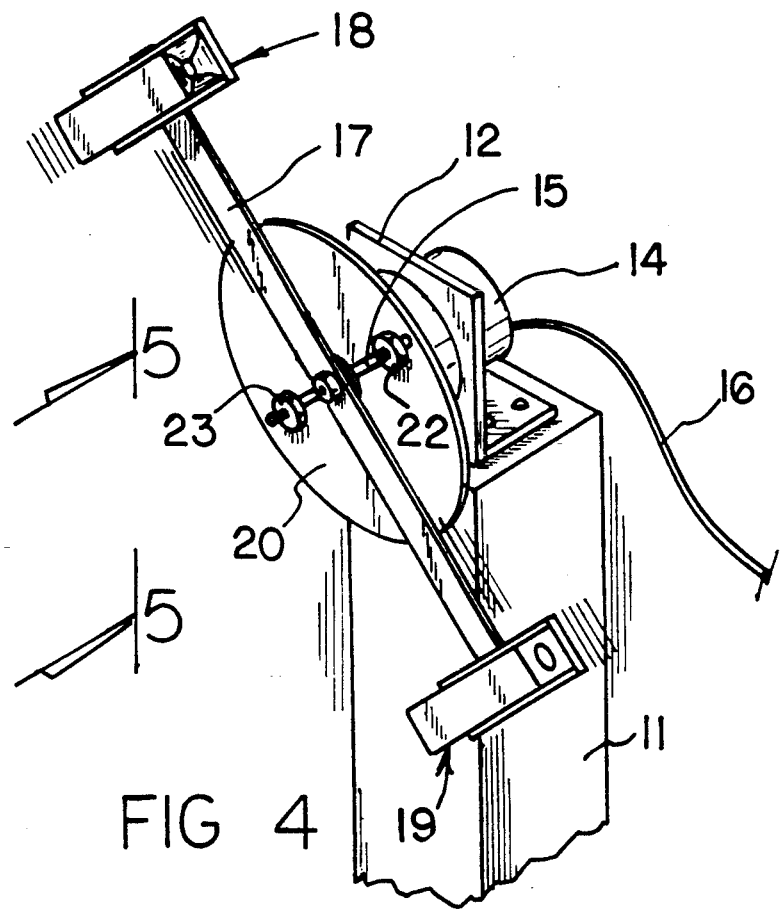
FIG. 4 is an isometric illustration of the apparatus utilizing a support disc and counterweight structure thereon.
Figure 5:
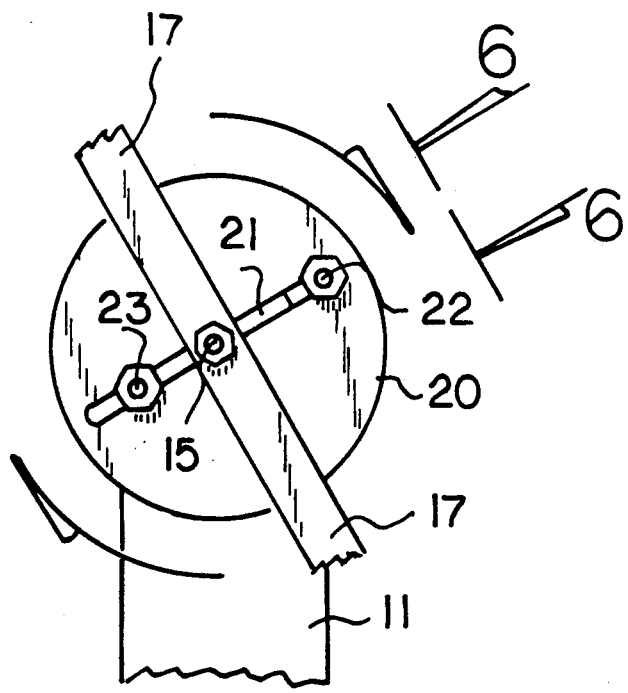
FIG. 5 is an orthographic view, taken along the lines 5—5 of FIG. 4 in the direction indicated by the arrows.
Figure 6:
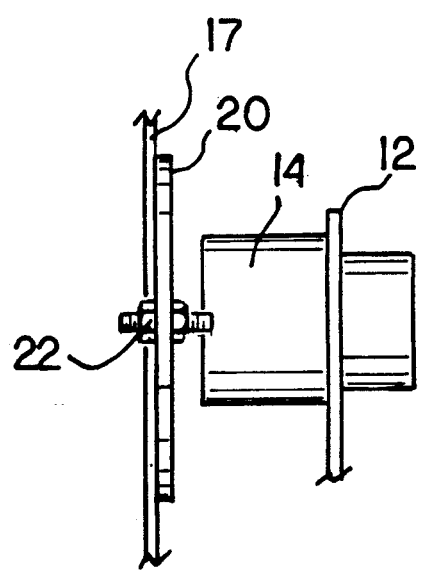
FIG. 6 is an orthographic view, taken along the lines 6—6 of FIG. 5 in the direction indicated by the arrows.

The FIG. 4 illustrates the apparatus further including a support disc 20 that is concentric and fixedly mounted relative to the output shaft 15. The support disc 20 includes a diametrically aligned slot 21 orthogonally oriented relative to the mounting arm 17, with the slot 21 wholly contained within the disc 20. Respective first and second weight members 22 and 23 are slidably mounted in a radial orientation relative to the disc 20 on opposed sides of the arm 17. Displacement of the weights 22 and 23 permits the effecting of an eccentric relationship relative to the disc 20 by the weights 22 and 23 and accordingly effecting vibration directed through the output shaft 15 and the rigid post 11 to effect warding off of various subterranean pests, such as groundhogs and the like.

Figure 7:
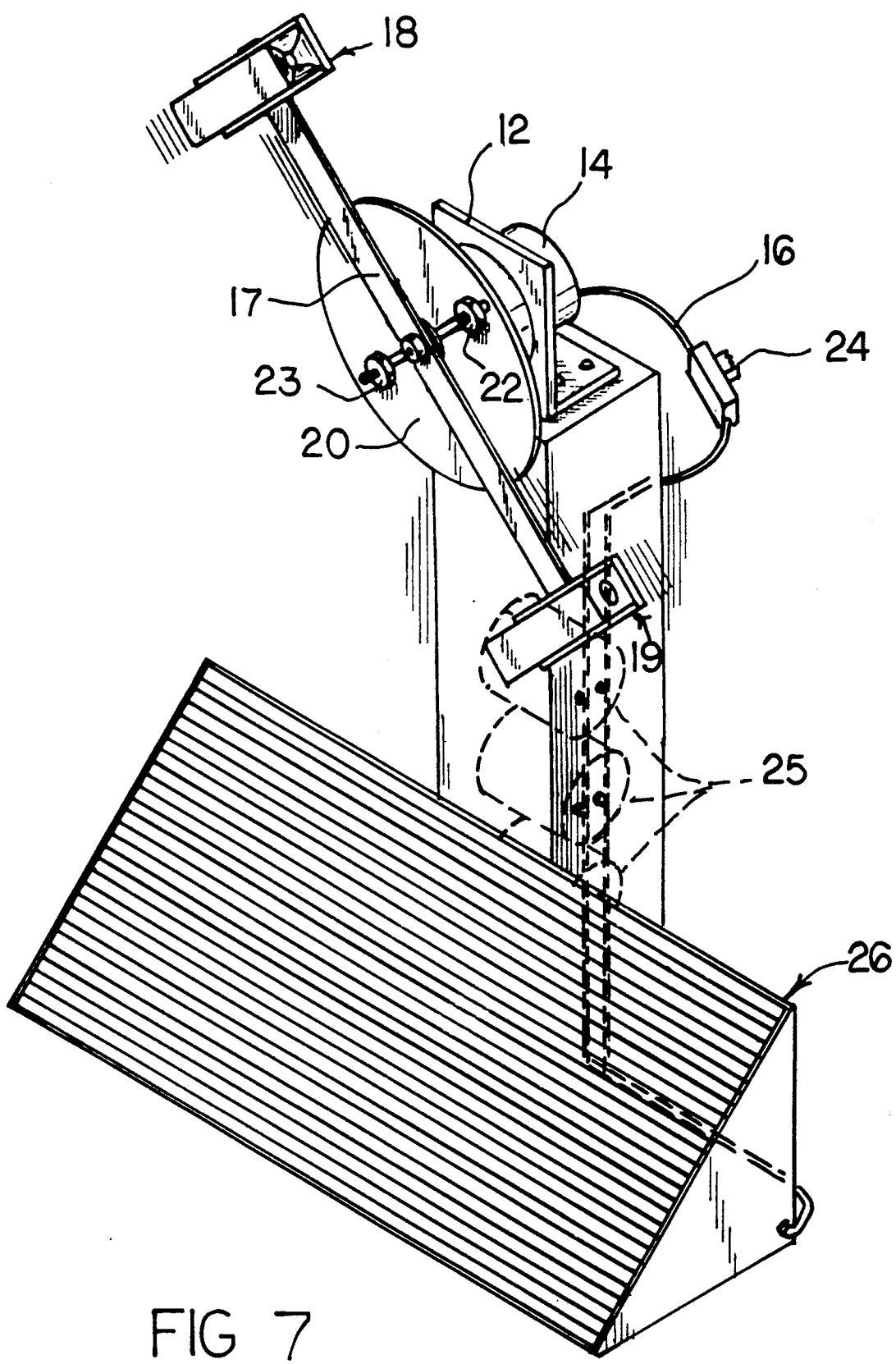
FIG. 7 is an isometric illustration of the invention utilizing a solar panel electrical generation structure.

The FIG. 7 illustrates the use of an on/off switch 24 mounted within the electrical power supply cord 16, with a plurality of storage batteries 25 mounted and contained within the post 11 below its upper distal end in communication with a solar collector cell 26 to provide for continuous power supply as required to the drive motor 14.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A deer repelling apparatus, comprising,
    a rigid support post, the rigid support post including an upper distal end and a front wall, and
    a mounting plate mounted to the upper distal end, and
    a drive motor fixedly secured to the mounting plate, with the drive motor including an output shaft, and
    electrical power supply directed through the drive motor, and
    a mounting arm medially and orthogonally intersecting and fixedly secured to the output shaft, and
    the mounting arm including an arm first end and an arm second end, the arm first end and the arm second end spaced an equal predetermined spacing relative to the output shaft, the arm first end including a first whistle member, and the arm second end including a second whistle member.

2. An apparatus as set forth in claim 1 wherein the output shaft is orthogonally oriented relative to the support post front wall and extends beyond the support post front wall.

3. An apparatus as set forth in claim 2 wherein the first whistle member and the second whistle member are tangentially aligned relative to a predetermined circle defined by rotation of the mounting arm first end and the mounting arm second end.

4. An apparatus as set forth in claim 3 including a support disc, the support disc concentrically mounted relative to and fixedly secured to the output shaft positioned adjacent the mounting arm and rearwardly thereof between the mounting arm and the drive motor, the support disc including a diametrically aligned slot mounted within the support disc, wherein the slot is orthogonally oriented relative to the mounting arm and wherein the slot includes a first weight member and a second weight member, the first weight member and the second weight member slidably and adjustably mounted within the slot and positioned on opposed sides of the mounting arm to impart vibration through the support post.

5. An apparatus as set forth in claim 4 wherein the electrical power supply includes an on/off switch and a plurality of storage batteries mounted within the support post, and a solar collector cell mounted in electrical communication with the batteries to provide for electrical replenishment of the batteries during use.

* * * * *